(No Model.)

W. R. BELL.
MECHANICAL MOVEMENT.

No. 427,496. Patented May 6, 1890.

Witnesses
S. O. Edmonds
Wm. M. Iliff

Inventor
William R. Bell
By Gifford & Brown
his Attorneys.

UNITED STATES PATENT OFFICE.

WILLIAM R. BELL, OF NEW YORK, N. Y.

MECHANICAL MOVEMENT.

SPECIFICATION forming part of Letters Patent No. 427,496, dated May 6, 1890.

Application filed August 21, 1889. Serial No. 321,473. (No model.)

*To all whom it may concern:*

Be it known that I, WILLIAM R. BELL, of New York, in the county and State of New York, have invented a certain new and useful Improvement in Mechanical Movements, of which the following is a specification.

The object of this improvement is to produce a simple and effective mechanism for converting reciprocating into rotary motion.
I will describe a mechanism embodying my improvement, and then point out the novel features in claims.

Figure 1:
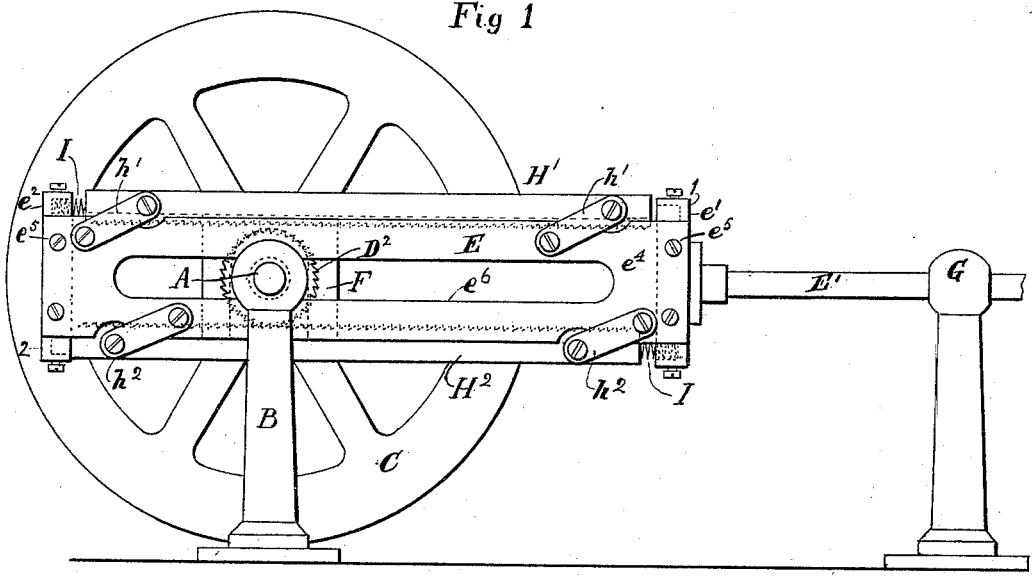
Figure 2:
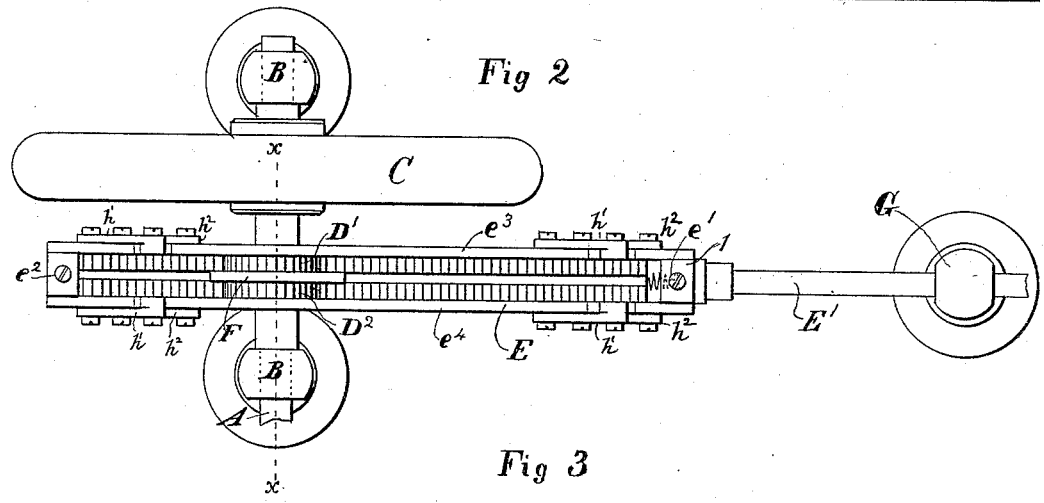
Figure 3:
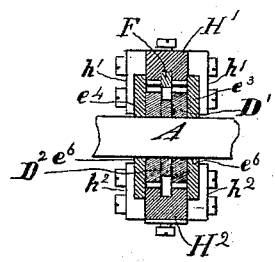

In the accompanying drawings, Figure 1 is a side view, with a certain bar removed, of a mechanism embodying my improvement. Fig. 2 is a plan or top view. Fig. 3 is a transverse section taken at the plane of the line $x$ $x$, Fig. 2.

Similar letters of reference designate corresponding parts in all the figures.

A designates a rotary shaft supported in bearings B, which may be of any suitable character, but are here shown as located in upright posts. Affixed to this shaft I have shown a balance-wheel C. The shaft may have a band, pulley, or any other contrivance for transmitting rotary motion.

$D'$ $D^2$ designate two ratchet-wheels affixed to the shaft A. The teeth of these ratchet-wheels are similar and extend in the same direction; hence a single wheel will subserve the purpose of two. Where the single wheel is employed, it may be advantageous to groove it circumferentially midway between the side edges, so as to permit of the use of a plate F across the periphery of the wheel between the two sides. The purpose of this plate I will make clear presently.

E designates a frame, here shown as of rectangular form and consisting, essentially, of two end pieces $e'$ $e^2$ and two side pieces $e^3$ $e^4$, secured thereto by screws $e^5$. Each of the side pieces $e^3$ $e^4$ of the frame E is provided with a longitudinal slot $e^6$. Through the slots of the two side pieces $e^3$ $e^4$ passes the shaft A, the upper edges of the slots forming the bearings of the frame upon the shaft, whereby the frame is supported. To the frame E is secured a rod $E'$, which is supported by and works longitudinally through the bearing G, here shown as located in an upright post.

The frame E has connected to it bars $H'$ $H^2$, one above and the other below the ratchet-wheels $D'$ $D^2$. The opposite faces of these bars $H'$ $H^2$ are provided with ratchet-teeth for engaging with the ratchet-teeth of the wheels $D'$ $D^2$, or the single wheel used as a substitute for these two wheels. Each of the bars is shown as longitudinally grooved on the side toward the wheels. This is for the accommodation of the plate F, to which I have previously referred. The two bars are connected by links $h'$ $h^2$ with the side pieces $e^3$ $e^4$ of the frame E. The end piece $e'$ of the frame E projects upwardly, so as to limit its motion and take the strain upon it. The end piece $e^2$ of the frame projects downwardly opposite to the bar $H^2$, so as to limit its motion and take the strain upon it. The upper part of the end piece $e'$ may be said to form a stop 1, and the lower part of the end piece $e^2$ may be said to form a stop 2. Preferably there will be springs I interposed between one end of each of the bars $H'$ $H^2$ and the opposite end piece of the frame E for the purpose of moving the bar in such direction as that it will be by the links forced toward the ratchet-wheels.

The frame E is reciprocated longitudinally by any suitable means. When reciprocated in one direction, one of the bars $H'$ $H^2$ will be caused to engage with the ratchet-wheels and the other will be relaxed. For instance, when the frame E is reciprocated to the left the bar $H'$ will by the action of the links, aided by the corresponding spring, be forced into engagement with the ratchet-wheels and will effect their rotation, and when the frame is reciprocated to the right the bar $H^2$ will by the action of its links, aided by the corresponding spring, force this bar into engagement with the ratchet-wheels. As the teeth of the two bars $H'$ $H^2$ are reversed they will together impart a practically continuous and uniform rotary motion to the ratchet-wheels, and hence to the shaft A.

The plate F is of such size in a vertical direction that when one of the bars $H'$ $H^2$ is forced toward the ratchet-wheels it will, through the plate F, force the other bar away from the ratchet-wheels. The plate F is made bifurcate or vertically slotted to straddle the shaft A.

It will be seen that by my improvement I produce a very simple and efficient mechanism whereby reciprocating motion may be converted into rotary motion.

What I claim as my invention, and desire to secure by Letters Patent, is—

1. The combination of a rotary shaft, a wheel on the shaft, bars longitudinally movable in one direction and arranged on opposite sides of the wheel and constructed to reciprocate transversely to the axis of the shaft, a frame constructed to reciprocate transversely to the axis of the shaft, and links connecting the bars to the frame, substantially as specified.

2. The combination of a rotary shaft, a ratchet-wheel on the shaft, bars longitudinally movable in one direction and arranged on opposite sides of the ratchet-wheel and having reversely-arranged ratchet-teeth and constructed to reciprocate transversely to the axis of the shaft, a frame constructed to reciprocate transversely to the axis of the shaft, and links connecting the bars to the frame, substantially as specified.

3. The combination of a rotary shaft, a wheel on the shaft, bars arranged on opposite sides of the wheel and constructed to reciprocate transversely to the axis of the shaft, a frame constructed to reciprocate transversely to the axis of the shaft, links connecting the bars to the frame, and springs for moving the bars longitudinally in one direction, substantially as specified.

4. The combination of a rotary shaft, a wheel on the shaft, bars arranged on opposite sides of the wheel and constructed to reciprocate transversely to the axis of the shaft, a frame constructed to reciprocate transversely to the axis of the shaft, links connecting the bars to the frame, and stops on the frame for taking the thrust of the bars when at work, substantially as specified.

5. The combination of a rotary shaft, a wheel on the shaft, bars arranged on opposite sides of the wheel and constructed to reciprocate transversely to the axis of the shaft, a frame constructed to reciprocate transversely to the axis of the shaft and having the bars connected with it so that they may yield toward and away from the wheel, and a plate or piece intermediate of the two bars forcing one away from the wheel when the other moves toward the wheel, substantially as specified.

6. The combination of a rotary shaft, a wheel on the shaft, said wheel having a groove or space at the periphery, bars arranged on opposite sides of the wheel and constructed with grooves or spaces in their opposite faces, a frame constructed to reciprocate transversely to the axis of the shaft and having the bars connected with it so that they may yield toward and away from the wheel, and a plate or piece intermediate of the two bars, forcing one away from the wheel when the other moves toward the wheel, said plate or piece being accommodated by the grooves or spaces aforesaid, substantially as specified.

WILLIAM R. BELL.

Witnesses:
S. O. EDMONDS,
WM. M. ILIFF.